US011356437B2

(12) United States Patent
Bäcklund et al.

(10) Patent No.: US 11,356,437 B2
(45) Date of Patent: Jun. 7, 2022

(54) METHOD FOR HANDLING FEEDBACK WITHIN A SECURITY SYSTEM

(71) Applicant: Irisity AB, Gothenburg (SE)

(72) Inventors: Marcus Bäcklund, Lidingo (SE); Victor Hagelbäck, Nodinge (SE)

(73) Assignee: Irisity AB, Gothenburg (SE)

( * ) Notice: Subject to any disclaimer, the term of this patent is extended or adjusted under 35 U.S.C. 154(b) by 152 days.

(21) Appl. No.: 16/623,075

(22) PCT Filed: Jun. 19, 2018

(86) PCT No.: PCT/SE2018/050650
§ 371 (c)(1),
(2) Date: Dec. 16, 2019

(87) PCT Pub. No.: WO2018/236278
PCT Pub. Date: Dec. 27, 2018

(65) Prior Publication Data
US 2020/0220859 A1    Jul. 9, 2020

(30) Foreign Application Priority Data
Jun. 20, 2017    (SE) .................................. 1750792-2

(51) Int. Cl.
*H04L 29/06* (2006.01)
*G06F 9/451* (2018.01)
*H04L 9/40* (2022.01)

(52) U.S. Cl.
CPC ............ *H04L 63/083* (2013.01); *G06F 9/451* (2018.02)

(58) Field of Classification Search
CPC .............................. H04L 63/083; G06F 9/451
See application file for complete search history.

(56) References Cited

U.S. PATENT DOCUMENTS

| | | | |
|---|---|---|---|
| 9,612,802 B1 | 4/2017 | Cox et al. | |
| 2010/0106542 A1 | 4/2010 | Green et al. | |
| 2014/0207532 A1* | 7/2014 | Thapliyal | G06Q 10/06398 705/7.42 |
| 2014/0365397 A1 | 12/2014 | Mitra et al. | |
| 2015/0066806 A1* | 3/2015 | Aneja | G06Q 30/0282 705/347 |
| 2015/0106873 A1 | 4/2015 | Marsh et al. | |
| 2015/0278913 A1 | 10/2015 | Sakata | |
| 2015/0309516 A1 | 10/2015 | Williams et al. | |
| 2017/0046753 A1 | 2/2017 | Deupree | |

OTHER PUBLICATIONS

International Search Report and Written Opinion for International Application No. PCT/SE2018/050650 dated Oct. 12, 2018, 12 pages.
Extended European Search Report dated Mar. 17, 2021 for EP Application No. 18820929.0, 8 pages.

* cited by examiner

*Primary Examiner* — Tadesse Hailu
*Assistant Examiner* — Darrin Hope
(74) *Attorney, Agent, or Firm* — RMCK Law Group, PLC

(57) ABSTRACT

The present disclosure relates to a computer implemented method of providing feedback within a security system, specifically provided as a collaborative rating for a security service as indicated by a plurality of users. The present disclosure also relates to a corresponding security system and a computer program product.

10 Claims, 2 Drawing Sheets

METHOD FOR HANDLING FEEDBACK WITHIN A SECURITY SYSTEM

CROSS-REFERENCE TO RELATED APPLICATIONS

This application is a 371 U.S. National Stage of International Application No. PCT/SE2018/050650, filed Jun. 19, 2018, which claims priority to Swedish Patent Application No. 1750792-2, filed Jun. 20, 2017. The disclosures of each of the above applications are incorporated herein by reference in their entirety.

TECHNICAL FIELD

The present disclosure relates to a computer implemented method of handling feedback within a security system, specifically provided as a collaborative rating for a security service as indicated by a plurality of users. The present disclosure also relates to a corresponding security system and a computer program product.

BACKGROUND

In a conventional security system, a plurality of security devices, such as security cameras, are typically used for monitoring and surveillance of different locations of interest, sometimes denoted as security sites, where the video streams generated by the plurality of cameras are summoned to a human operator for deciding if any abnormalities exist. In some instances, the security system may additionally comprise a computer system performing video processing of the video streams, such that the human operator only needs to be involved if the computer system automatically has decided that an abnormality is present, e.g. a possible alarm condition that needs interaction by the human operator. A security system may also comprise further security devices, such as motion detectors (e.g. PIR), magnetic contacts, passage control arrangements, etc.

With an increasing interest in the positive effects following the application and use of a security system, such as a reduced risk of sabotage and/or break-in, the security market is greatly expanding. However, with an increasing number security sites follows the need to engage a large staff, including e.g. installation technicians, operators, security guards, etc. With this in mind, it would be desirable to adapt the security system in such a way that staff feedback may be provided for the purpose of ensuring that a security service provided by the security system is kept at a high level, promoting high a staff service level.

SUMMARY

According to an aspect of the present disclosure, the above is at least partly met by a computer implemented method of providing feedback for a security system, the security system adapted to provide a security service, wherein the security system comprises a first mobile computing having a graphical user interface (GUI) adapted to be handled by a first user, a second mobile computing having a GUI adapted to be handled by a second user, and a server connected to the first and the second mobile computing device over a network, wherein the method comprises the steps of presenting, at the GUI of the first mobile computing device, a request for the first user to provide a rating relating to the security service, presenting, at the GUI of the second mobile computing device, a request for the second user to provide a rating relating to the security service, receiving, at the server, the ratings from the first and the second mobile computing device, and determining, at the server, a collaborative rating of the security service based on the rating provided by the first and the second user.

By means of the present disclosure, users connected to the security system may use their respective mobile computing device to provide feedback information in the form of a rating, relating to at least one of a collection of security services provided by the security system. The mobile computing devices are each provided with a GUI specifically adapted for the different security services provides, for example providing the users, through the GUI, with a request for a rating relating to one of the services.

In accordance to the present disclosure, the collection of services may for example comprise installation of a security device configured to carry out predetermined surveillance task within the security system, or an attentiveness level to an incident reported by a security device comprised with the security system. Accordingly, in case for example an installation technician is to install e.g. a camera at a security site, the owner of the property may be given a chance to provide the installation technician with feedback relating to how pleased the owner of the property is with the installation of the camera. Such feedback may thus relate to the e.g. the appearance of the installation technician, how well on a scheduled time the installation technician arrived, the quality of the visual part of the installation, etc. Similarly, in relation to the attentiveness level to an incident reported by a security device, e.g. a consumer or an otherwise involved person may be allowed to provide feedback on how well e.g. a human operator or a security guard handle a fire or burglary alarm or similar.

An advantage following the concept as provided by the present disclosure is that feedback/rating may be provided at "all levels" within the security system and relating to any kind of tasks provided by a staff member as well as to a component (such as a security device) comprised with the security system or a function provided by the security system. In any case, the rating/feedback will be seen from a collaborative manner and will not solely be related to a single user.

As defined in accordance to the present disclosure, the feedback/rating is provided by at least a first and a second user using their respective mobile computing device. In a preferred embodiment of the present disclosure the first user is an end user of the security system and the second user is an expert operator of the security system. Accordingly, the end users rating may be compared to the expert operator for normalizing the rating provided to the security system in relation to the security task.

Alternatively, only in case the rating provided by the first user is lower than a predetermined threshold, then the second user (i.e. the expert operator) is initiated for providing his feedback to the security system. The collaborative rating may in some embodiments of the present disclosure be allowed to be weighted dependent on e.g. an expert level of the second user. That is, in case a second user with an in comparison high expert level is reviewing e.g. a work that has been given an in comparison low rating by an (unskilled) end user, then the experts rating may be given an in comparison higher weight as compared to the end user's rating.

The concept in accordance to the present disclosure may also be used for peer review of e.g. a task provided by a staff member. In such an embodiment the first user may for example be the installation technician installing e.g. the security device, and the second user may be e.g. a colleague assigned to review the work performed by the installation technician. Accordingly, the GUI presented at the first mobile computing device may be adapted to present e.g. a check-list for the first user to review and respond to, where the check-list is adapted based on e.g. the type of security device having been installed. Possibly, the GUI may also be adapted to request the first user to take a photo or a video of the installation. Following the completion of the rating performed by the first user, the second user may be requested to rate the installation performed by the installation technician (i.e. also being the first user in this case). The GUI presented at the second mobile computing device may in a corresponding manner be adapted to present e.g. a check-list for the second user to complete/respond to, for providing the rating of the work performed by the installation technician. The above embodiment may in a corresponding manner be applicable e.g. in relation to security guards, operators reviewing a video sequence of an incident, etc.

It may in accordance to the proposed solution allow for e.g. remuneration for e.g. the installation technician (i.e. in case a staff member is rated), the human operator or the security guard to be at least partly dependent on the collaborative rating provided by the users. That is, for example an identified staff member receiving a rating above an overall average rating for a plurality of staff members within a specific category may be given e.g. an increase salary as compare to the opposite. Similarly, in case a specific staff member is given an overall low rating this may be provided as an indication that the quality for work performed by that specific staff member is in comparison low, whereby a specific program may be applied for further training that specific staff member.

Additionally, in case an accumulated rating above an average, over time, is received by a specific staff member, this may be used for transitioning that specific staff member from e.g. a junior level to a senior level and further to an expert level. Thus, the rating may in accordance to the present disclosure be used for automatically assigning a level of the staff member as well as for controlling the remuneration package for the specific staff member.

In relation to rating of the component comprised with or the functionality provided by the security system, e.g. an in comparison low rating of a component may provide an indication of a desire to exchange the type of component. In regards to e.g. a security camera, in case the camera captures images with an in comparison low image quality then this may in some instances result in an in comparison low rating for the security camera. This applies in a similar manner to e.g. further security devices comprised with the security system and providing a security service within the security system.

Similarly, an in comparison high rating for e.g. a new functionality provided by the security system may be seen as an indication that the functionality is well accepted an e.g. may be distributed throughout the security system.

As stated above, the security services may comprise a collection of different services, for example within different categories. In accordance to the present disclosure, the GUI presented to the users may be automatically adapted based on the specific category for a security service to be rated. That is, in case an installation of a security device is to be rated then the GUI may be adapted in a manner specifically targeting feedback relating to how well the installation technician handled the installation, possibly requesting a specific type of information from the users. Correspondingly, in case the security service relates to how well a security guard handled the above mentioned burglar alarm, then the GUI for providing rating may be adapted differently, e.g. to relate to a response time, or similar.

According to another aspect of the present disclosure there is provided a security system adapted to provide a security service, wherein the security system comprises a first mobile computing having a graphical user interface (GUI) adapted to be handled by a first user, a second mobile computing having a GUI adapted to be handled by a second user, and a server connected to the first and the second mobile computing device over a network, wherein security system is configured to present, at the GUI of the first mobile computing device, a request for the first user to provide a rating relating to the security service, present, at the GUI of the second mobile computing device, a request for the second user to provide a rating relating to the security service, receive, at the server, the ratings from the first and the second mobile computing device, and determine, at the server, a collaborative rating of the security service based on the rating provided by the first and the second user. This aspect of the present disclosure provides similar advantages as discussed above in relation to the previous aspect of the present disclosure.

According to a still further aspect of the present disclosure there is provided a computer program product comprising a non-transitory computer readable medium having stored thereon computer program means for operating a security system adapted to provide a security service, wherein the security system comprises a first mobile computing having a graphical user interface (GUI) adapted to be handled by a first user, a second mobile computing having a GUI adapted to be handled by a second user, and a server connected to the first and the second mobile computing device over a network, wherein the computer program product comprises code for presenting, at the GUI of the first mobile computing device, a request for the first user to provide a rating relating to the security service, code for presenting, at the GUI of the second mobile computing device, a request for the second user to provide a rating relating to the security service, code for receiving, at the server, the ratings from the first and the second mobile computing device, and code for determining, at the server, a collaborative rating of the security service based on the rating provided by the first and the second user. Also this aspect of the present disclosure provides similar advantages as discussed above in relation to the previous aspects of the present disclosure.

A software executed by the server for operation in accordance to the present disclosure may be stored on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art.

Further features of, and advantages with, the present disclosure will become apparent when studying the appended claims and the following description. The skilled addressee realize that different features of the present disclosure may be combined to create embodiments other than those described in the following, without departing from the scope of the present disclosure.

BRIEF DESCRIPTION OF THE DRAWINGS

The various aspects of the present disclosure, including its particular features and advantages, will be readily understood from the following detailed description and the accompanying drawings, in which.

DETAILED DESCRIPTION

Figure 1:
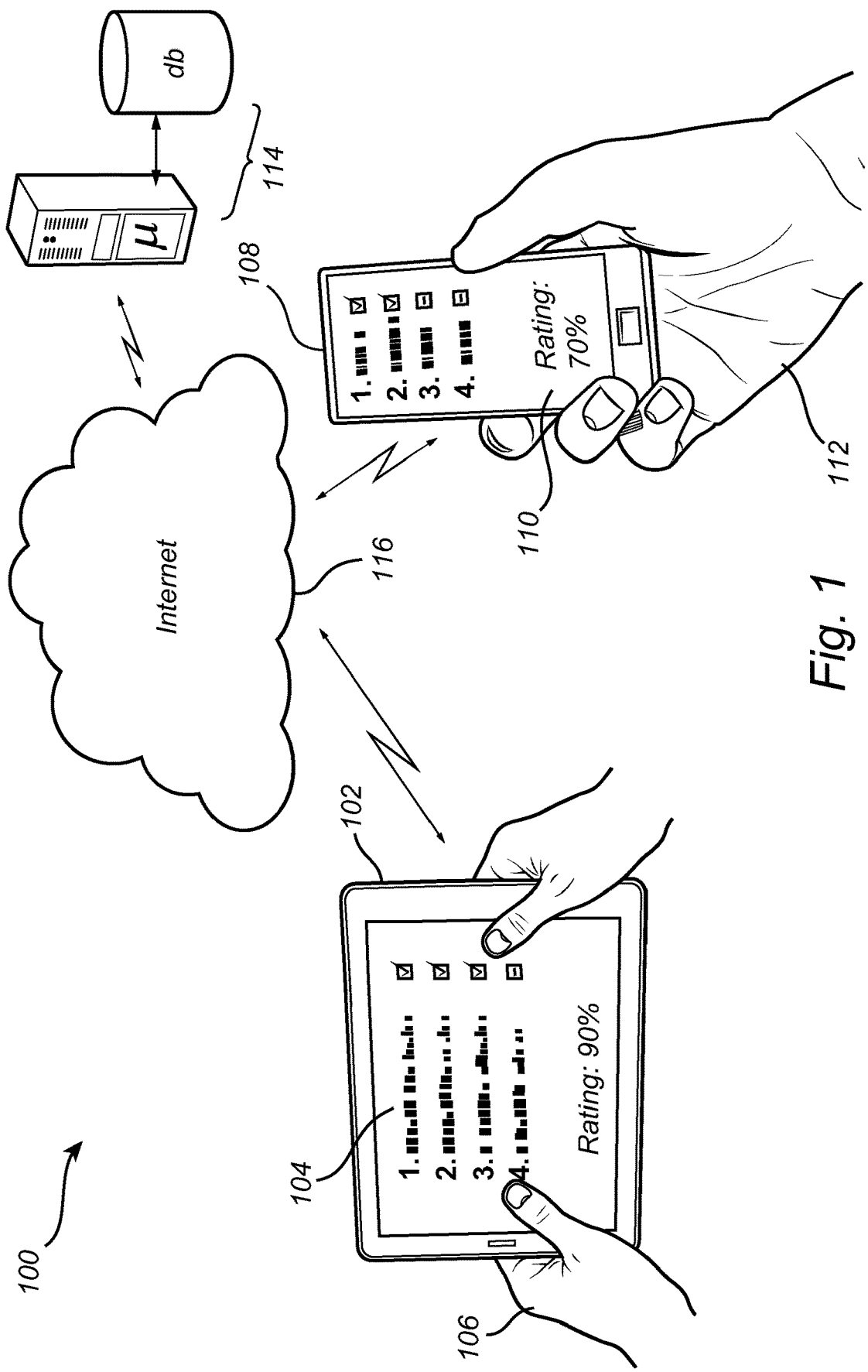
FIG. 1 illustrates a security system according to a currently preferred embodiment of the present disclosure.
Figure 2:
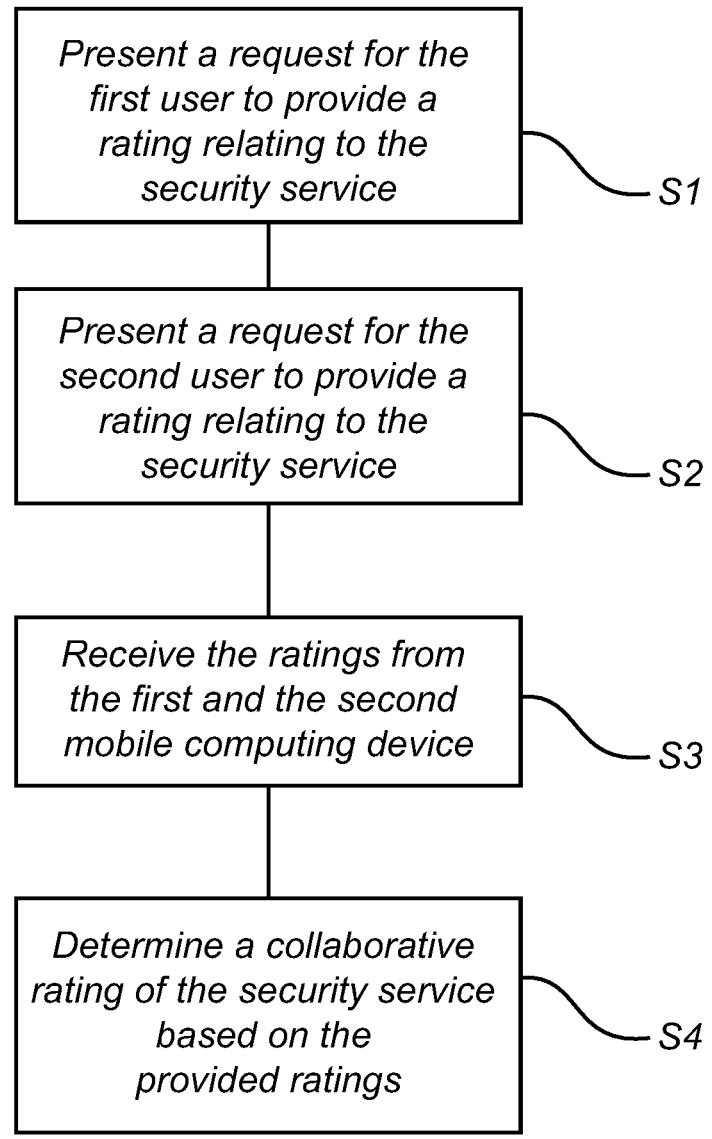
FIG. 2 shows a flow chart of a method according to an embodiment of the present disclosure.

The present disclosure will now be described more fully hereinafter with reference to the accompanying drawings, in which currently preferred embodiments of the present disclosure are shown. This present disclosure may, however, be embodied in many different forms and should not be construed as limited to the embodiments set forth herein; rather, these embodiments are provided for thoroughness and completeness, and fully convey the scope of the present disclosure to the skilled addressee. Like reference characters refer to like elements throughout.

Referring now to the drawings and to FIG. 1 in particular, there is depicted a security system 100 according to a possible embodiment of the present disclosure. The security system 100 comprises a first mobile computing 102 having a graphical user interface (GUI) 104 adapted to be handled by a first user 106, a second mobile computing 108 having a GUI 110 adapted to be handled by a second user 112, and a server/database 114 connected to the first 102 and the second 108 mobile computing device over a network 116, such as the Internet. The first 102 and the second 108 mobile computing device may for example be a laptop computer, a mobile phone, a tablet, etc.

The network 116 may be in part be wired or wireless, including for example wired connections like a building LAN, a WAN, an Ethernet network, an IP network, etc., and wireless connections like WLAN, CDMA, GSM, GPRS, 3G mobile communications, 4G mobile communications, Bluetooth, infrared, or similar.

The server 114 may in one embodiment be a cloud-based server. Thus, the computing power provided by means of the present disclosure may be distributed between a plurality of servers, and the location of the servers must not be explicitly defined. Advantageous following the use of a cloud-based solution is also the inherent redundancy achieved.

As illustrated in FIG. 1, the GUI 104 of the first user mobile computing 102 is exemplified to show a check-list to be completed/responded to by the first user 106. Preferably, the content of the check-list is adapted based on the security service (also defined as a task) to be rated, such as the installation of a security device (not shown) adapted to perform a surveillance task within the security system. In line with the discussion above, the first user may for example be an end user having requested the installation of the security device, or possibly the installation technician that has installed the security device.

The server 114 will accordingly have knowledge of the security service/task to be rated, in this case the exemplified installation of the security device. Accordingly, the server 114 will provide information to the first mobile computing 102 for adapting the GUI 104 to provide a request to the first user 106 for responding to e.g. a plurality of questions or to otherwise provide feedback/rating in relation to the performed task.

In the illustration provided in FIG. 1, the first user 104 has provided a positive response within the GUI 104 of the first mobile computing device 102 in relation to three out of four of the questions provided within the check-list. Accordingly, based on the feedback, the first mobile computing device 102 (or the server 114) determine that the overall rating for the task is 90% (e.g. out of 100%). In a possible embodiment the rating is provided as related to the specific installation technician, or to the company assigning the installation technician. It should be understood that the GUI may be arranged differently, e.g. simply providing the first user 106 to provided either one of a "thumbs up" or a "thumbs down" in relation to the security service/task provided by e.g. the installation technician when installing the security device.

The rating (e.g. 90%) formed based on the user action performed within the GUI 104 at the first mobile computing device 102 will then be communicated to the server 114 for further processing as will be elaborated further below.

Correspondingly, the GUI 110 provided within the second 108 mobile computing device is adapted to provide a similar rating in relation to the security service/task.

In one embodiment the second user 112 is also an end user, and the second user 112 is requested to respond to questions corresponding to what was exemplified above, i.e. in relation to the specific installation technician when installing a similar security device at a location of the second user 112. That is, in this embodiment there is no previous relation between the first 106 and the second 112 user, the only relation is that the same installation technician is to install a similar security device. In a corresponding manner as above, the second user 112 will "fill out" the check-list and an overall rating will be formed, in this case 70% (again out of 100%). The rating formed at the second mobile computing device 118 will also be communicated to the server 114.

At the server 114, the ratings provided from the first 102 and the second 108 mobile computing devices will be processed for forming an overall collaborative rating. The determination of the collaborative rating may, as indicated above, be allowed to take into account possible profile information for at least one of the first 106 and the second user 112. That is, if it e.g. is known that the second user 112 has previous knowledge of for example an earlier installation of a similar security device, than the rating provided by the second user 112 may be allowed to be normalized in relation to previously provided ratings.

It should be understood that the collaborative rating typically formed at the server normally is based on feedback/ratings provided from more than two users. In a typical implementation the rating is provided by a large plurality (e.g. above 10 or 20) of users that provide feedback in relation to a specific security service or a group of security services. Accordingly, the collaborative rating is in one embodiment statistically confirmed before communicated to the staff member (such as the exemplified installation technician). The staff member having been rated may possibly be provided with a corresponding mobile computing device (not shown) that is adapted to provide him/her with feedback in relation to the performed security service or a group of security services. Also this mobile computing device may be arranged in communication with the server 114 over the Internet 116.

Additionally, it may in some embodiments of the present disclosure to allow the collaborative rating to be further dependent on an automatic rating determined by e.g. the server 114 or by a security device comprised with the security system 100. That is, e.g. means comprised with the server 114 may be adapted to determine a response time for a human operator or a quality level for an image or video stream generated by a security camera. Accordingly, the response time/the image quality level may form an input for an automatic determination of a rating for the human operator or the camera, to be taken into account in determining the collaborative rating.

Based on the collaborative rating provided to the staff member using his/her mobile computing device, a GUI presented at this mobile computing device may be adapted to include automatically formed instructions provided to the staff member for improving the collaborative rating. Such instructions may for example comprise a request for provided to the staff member for improving the collaborative rating, where the request in turn is based on the collaborative rating and possible improvement point as indicated by the first 106 and/or the second 112 user.

The above discussion has been provided in line with an installation technician installing a possible security device and where a first and a second end user are provided with a respective mobile computing device provided with a GUI specifically adapted for providing feedback/rating of the security service/task performed by the installation technician. However, as indicated above the concept in accordance to the present disclosure may be used for peer-reviewing of a security service/task performed by any person/staff member associated with the security system 100, such as an operator handling incoming incident reports generated by e.g. a security device, a security guard out located by the operating due to the incident, etc.

In addition, the collaborative rating formed by the security system 100 may subsequently be used for automatically (or semi-automatically) adjusting remuneration for the staff member. The collaborative rating may also be used for possibly certifying the staff member. That is, it may be possible to adapt the security system 100 to further automatically certify the staff member in case e.g. the collaborative rating over a predetermined period is indicated as above a predetermined threshold, e.g. 90%. Thus, in case the staff member is defined as a certified staff member, he/she may then be allowed to performed specific security services/tasks that are not allowed to be performed by non-certified staff members.

In summary, the present disclosure relates to a computer implemented method of providing feedback for a security system 100, the security system 100 adapted to provide a security service, wherein the security system comprises a first mobile computing 102 having a graphical user interface (GUI) 104 adapted to be handled by a first user 106, a second mobile computing 108 having a GUI 110 adapted to be handled by a second user 112, and a server 114 connected to the first 102 and the second 108 mobile computing device over a network 116, wherein the method comprises the steps of presenting, S1, at the GUI 104 of the first mobile computing device 102, a request for the first user 106 to provide a rating relating to the security service, presenting, S2, at the GUI 110 of the second mobile computing device 108, a request for the second user 112 to provide a rating relating to the security service, receiving, S3, at the server 114, the ratings from the first 102 and the second 108 mobile computing device, and determining, S4, at the server 114, a collaborative rating of the security service based on the rating provided by the first 106 and the second 112 user.

By means of the present disclosure, users connected to the security system may use their respective mobile computing device to provide feedback information in the form of a rating, relating to at least one of a collection of security services provided by the security system.

The above detailed description of the present disclosure has been focused on rating of e.g. a staff member assigned to the security system. However, as indicated above the concept provided in accordance to the present disclosure may be equally useful for rating of a security device, such as a security camera, a motion detector, a magnetic contact, passage control arrangements, etc., as well as in regards to a functionality (e.g. software/App based) provided by the security system.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the present disclosure has been described with reference to specific exemplifying embodiments thereof, many different alterations, modifications and the like will become apparent for those skilled in the art.

In addition, variations to the disclosed embodiments can be understood and effected by the skilled addressee in practicing the claimed present disclosure, from a study of the drawings, the disclosure, and the appended claims. Further-more, in the claims, the word "comprising" does not exclude other elements or steps, and the indefinite article "a" or "an" does not exclude a plurality.

The invention claimed is:

1. A computer implemented method for providing feedback to a security system, the security system adapted to provide a security service, wherein the security system comprises:
a first mobile computing device having a graphical user interface (GUI) adapted to be handled by a first user;
a second mobile computing device having a GUI adapted to be handled by a second user, and
a server connected to the first and the second mobile computing device over a network,
wherein the method comprises:
presenting, at the GUI of the first mobile computing device, a request for the first user to provide a rating relating to the security service;
presenting, at the GUI of the second mobile computing device, a request for the second user to provide a rating relating to the security service;
receiving, at the server, the ratings from the first and the second mobile computing device, and
determining, at the server, a collaborative rating of the security service based on the rating provided by the first and the second user,
wherein:
the security service comprises a collection of services and determining the collaborative rating comprises determining a set of collaborative ratings for at least a portion of the collection of services,
the GUI presented at the first and the second mobile computing device is adapted for presenting requests for ratings relating to at least a portion of the collection of services,
the GUI presented at the first and the second mobile computing device is automatically adapted based on a specific category for the security service to be rated, and
the adapted GUI is dependent on a category of the user providing the rating.

2. The method according to claim 1, wherein the GUI of at least one of the first and the second mobile computing device is adapted for presenting requests for ratings relating to at least a portion of the collection of services.

3. The method according to claim 1, wherein the collection of services comprises at least one of:
installation of a security device configured to carry out predetermined surveillance task, or
an attentiveness level to an incident reported by a security device comprised with the security system.

4. The method according to claim 1, wherein the first user is an end user of the security system.

5. The method according to claim 1, wherein the second user is an expert operator of the security system.

6. The method according to claim 1, wherein the determination of the collaborative rating is weighted dependent on a category of the user providing the rating.

7. The method according to any claim 1, further comprising:
determining an identity of an operator providing the security service; and
determining an operator specific collaborative rating based on the user identity and the determined collaborative rating.

8. The method according to claim 7, wherein determining the operator specific collaborative rating is further dependent on a predetermined expert level for the operator.

9. A security system adapted to provide a security service, wherein the security system comprises:
a first mobile computing device having a graphical user interface (GUI) adapted to be handled by a first user;
a second mobile computing device having a GUI adapted to be handled by a second user, and
a server connected to the first and the second mobile computing device over a network,
wherein security system is configured to:
present, at the GUI of the first mobile computing device, a request for the first user to provide a rating relating to the security service;
present, at the GUI of the second mobile computing device, a request for the second user to provide a rating relating to the security service;
receive, at the server, the ratings from the first and the second mobile computing device, and
determine, at the server, a collaborative rating of the security service based on the rating provided by the first and the second user,
wherein:
the security service comprises a collection of services and determining the collaborative rating comprises determining a set of collaborative ratings for at least a portion of the collection of services,
the GUI presented at the first and the second mobile computing device is adapted for presenting requests for ratings relating to at least a portion of the collection of services,
the GUI presented at the first and the second mobile computing device is automatically adapted based on a specific category for the security service to be rated, and
the adapted GUI is dependent on a category of the user providing the rating.

10. A computer program product comprising a non-transitory computer readable medium having stored thereon computer program means for operating a security system adapted to provide a security service, wherein the security system comprises:
a first mobile computing device having a graphical user interface (GUI) adapted to be handled by a first user;
a second mobile computing device having a GUI adapted to be handled by a second user, and
a server connected to the first and the second mobile computing device over a network,
wherein the computer program product comprises:
code for presenting, at the GUI of the first mobile computing device, a request for the first user to provide a rating relating to the security service;
code for presenting, at the GUI of the second mobile computing device, a request for the second user to provide a rating relating to the security service;
code for receiving, at the server, the ratings from the first and the second mobile computing device, and
code for determining, at the server, a collaborative rating of the security service based on the rating provided by the first and the second user,
wherein:
the security service comprises a collection of services and determining the collaborative rating comprises determining a set of collaborative ratings for at least a portion of the collection of services, the GUI presented at the first and the second mobile computing device is adapted for presenting requests for ratings relating to at least a portion of the collection of services, the GUI presented at the first and the second mobile computing device is automatically adapted based on a specific category for the security service to be rated, and the adapted GUI is dependent on a category of the user providing the rating.

* * * * *